(12) United States Patent
Xiong et al.

(10) Patent No.: US 12,341,651 B2
(45) Date of Patent: Jun. 24, 2025

(54) DEVICE NETWORKING ACTIVATION METHOD, APPARATUS AND CLOUD NETWORK DEVICE

(71) Applicant: Alibaba Group Holding Limited, Grand Cayman (KY)

(72) Inventors: Yiqun Xiong, Hangzhou (CN); Jin Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 16/941,027

(22) Filed: Jul. 28, 2020

(65) Prior Publication Data

US 2020/0358882 A1 Nov. 12, 2020

Related U.S. Application Data

(63) Continuation of application No. PCT/CN2019/072676, filed on Jan. 22, 2019.

(30) Foreign Application Priority Data

Jan. 29, 2018 (CN) .......................... 201810085739.5

(51) Int. Cl.
*H04L 41/0806* (2022.01)
*G16Y 30/00* (2020.01)
(Continued)

(52) U.S. Cl.
CPC .......... *H04L 41/0806* (2013.01); *G16Y 30/00* (2020.01); *G16Y 40/35* (2020.01);
(Continued)

(58) Field of Classification Search
CPC ........ G16Y 30/00; G16Y 40/35; H04L 12/28; H04L 29/08; H04L 41/0806;
(Continued)

(56) References Cited

U.S. PATENT DOCUMENTS

| 7,149,792 | B1 | 12/2006 | Hansen et al. |
| 8,422,357 | B1 * | 4/2013 | Podolsky ............ H04L 41/0661 370/254 |

(Continued)

FOREIGN PATENT DOCUMENTS

| CN | 101068268 A | 11/2007 |
| CN | 101442425 A | 5/2009 |

(Continued)

OTHER PUBLICATIONS

Translation of International Search Report for corresponding PCT Application No. PCT/CN2019/072676 mailed Mar. 19, 2019, a counterpart foreign application for U.S. Appl. No. 16/941,027, 2 pages.

(Continued)

*Primary Examiner* — Jason D Recek
(74) *Attorney, Agent, or Firm* — Lee & Hayes, P.C.

(57) ABSTRACT

A device networking activation method including networking a device to be networked; in response to determining that the device to be networked is successfully networked, pushing an activation strategy for activating the device to be networked to the device to be networked that has been successfully networked; and activating the device to be networked that has been successfully networked according to the pushed activation strategy. The present disclosure solves the technical problem in the conventional techniques that the networking and activation of a device to be networked are not decoupled and therefore the activation of the device has low security and reliability.

20 Claims, 7 Drawing Sheets

(51) Int. Cl.
*G16Y 40/35* (2020.01)
*H04L 67/00* (2022.01)
*H04L 67/01* (2022.01)
*H04L 67/125* (2022.01)
*H04L 67/303* (2022.01)

(52) U.S. Cl.
CPC ............ *H04L 67/01* (2022.05); *H04L 67/125* (2013.01); *H04L 67/303* (2013.01); *H04L 67/34* (2013.01)

(58) Field of Classification Search
CPC ..... H04L 67/125; H04L 67/303; H04L 67/34; H04L 67/42; H04L 41/08–0809
See application file for complete search history.

(56) References Cited

U.S. PATENT DOCUMENTS

| | | | |
|---|---|---|---|
| 9,420,496 B1* | 8/2016 | Indurkar | H04W 76/19 |
| 9,933,763 B1* | 4/2018 | Menkveld | E05F 15/668 |
| 10,455,663 B2 | 10/2019 | Greene et al. | |
| 2003/0088703 A1 | 5/2003 | Kim | |
| 2005/0009498 A1 | 1/2005 | Ho et al. | |
| 2008/0120675 A1 | 5/2008 | Morad et al. | |
| 2010/0057921 A1 | 3/2010 | Zhang et al. | |
| 2011/0102139 A1* | 5/2011 | Girard, III | H04L 63/102 340/5.61 |
| 2011/0106635 A1 | 5/2011 | Khan et al. | |
| 2012/0131158 A1* | 5/2012 | Winters | H04L 67/12 709/222 |
| 2012/0309348 A1* | 12/2012 | De Atley | H04W 12/35 455/410 |
| 2014/0121786 A1 | 5/2014 | Chen et al. | |
| 2014/0180447 A1 | 6/2014 | Chen et al. | |
| 2015/0081837 A1* | 3/2015 | Bernier | H04W 4/50 709/217 |
| 2015/0181642 A1 | 6/2015 | Byrne et al. | |
| 2015/0262443 A1 | 9/2015 | Chong | |
| 2016/0044012 A1* | 2/2016 | Carrer | H04L 41/0806 726/6 |
| 2016/0066178 A1* | 3/2016 | Hawkins | H04W 12/04 455/435.1 |
| 2016/0087834 A1 | 3/2016 | Zhao et al. | |
| 2016/0134470 A1* | 5/2016 | Cregg | H04L 12/2809 709/223 |
| 2016/0219679 A1 | 7/2016 | Snyder et al. | |
| 2016/0232782 A1 | 8/2016 | Lee et al. | |
| 2017/0201585 A1 | 7/2017 | Doraiswamy et al. | |
| 2017/0288786 A1* | 10/2017 | Al-Mousa | H04B 11/00 |
| 2018/0198893 A1 | 7/2018 | Newman, Jr. et al. | |
| 2018/0295485 A1* | 10/2018 | Jalkanen | H04W 12/106 |
| 2019/0116087 A1* | 4/2019 | Hiller | H04L 67/12 |
| 2019/0158355 A1* | 5/2019 | Ramisetty | H04L 63/0853 |

FOREIGN PATENT DOCUMENTS

| | | |
|---|---|---|
| CN | 103024540 A | 4/2013 |
| CN | 103533634 | 1/2014 |
| CN | 104270758 A | 1/2015 |
| CN | 105306264 A | 2/2016 |
| CN | 105446305 A | 3/2016 |
| CN | 105451231 A | 3/2016 |
| CN | 106637805 A | 5/2017 |
| CN | 107451430 A | 12/2017 |
| EP | 3247083 A1 | 11/2017 |
| JP | 2003099146 A | 4/2003 |
| JP | 2007310509 A | 11/2007 |
| JP | 2012256090 A | 12/2012 |
| JP | 2015099530 A | 5/2015 |
| JP | 2016511951 A | 4/2016 |
| WO | WO2016020950 A1 | 2/2016 |
| WO | WO2017172109 A1 | 10/2017 |

OTHER PUBLICATIONS

Translation of Written Opinion for corresponding PCT Application No. PCT/CN2019/072676 mailed Mar. 19, 2019, a counterpart foreign application for U.S. Appl. No. 16/941,027, 4 pages.
Translation of Office Action dated May 7, 2021, from corresponding CN Patent Application No. 201810085739.5, 9 pages.
Translation of Search Report dated Apr. 26, 2021, from corresponding CN Patent Application No. 201810085739.5, 2 pages.
Extended European Search Report mailed Sep. 17, 2021 for European Patent Application No. 19743118.2, 9 pages.
Machine Translation of Second Office Action dated Oct. 25, 2021, from corresponding CN Patent Application No. 201810085739.5, 16 pages.
Supplental Chinese Search Report dated Sep. 6, 2021, from corresponding CN Patent Application No. 201810085739.5, 2 pages.
Translated Japanese Office Action mailed Jan. 31, 2023, for Japanese patent application No. 2020-541371, a foreign counterpart of U.S. Appl. No. 16/941,027, 10 pages.
European Office Action mailed Jan. 19, 2024 for European Application No. 19743118.2, a foreign counterpart to U.S. Appl. No. 16/941,027, 5 pages.

* cited by examiner

DEVICE NETWORKING ACTIVATION METHOD, APPARATUS AND CLOUD NETWORK DEVICE

CROSS REFERENCE TO RELATED PATENT APPLICATIONS

This application claims priority to and is a continuation of PCT Patent Application No. PCT/CN2019/072676, filed on 22 Jan. 2019 and entitled "Device Networking Activation Method, Apparatus, and Cloud Network Device," which claims priority to Chinese Patent Application No. 201810085739.5, filed on 29 Jan. 2018 and entitled "Device Networking Activation Method, Apparatus, and Cloud Network Device," which are incorporated herein by reference in their entirety.

TECHNICAL FIELD

The present disclosure relates to the field of the Internet of Things, and, more particularly, to device networking activation methods, apparatuses, and cloud network devices.

BACKGROUND

With the rapid development of Internet technology, the Internet of Things technology has become widely used in people's work and daily life. For example, people now use a mobile phone to remotely operate a rice cooker to complete the cooking process of food. In order for a user terminal to operate a device of the Internet of Things remotely, the device of the Internet of Things needs to be networked and activated to determine the legitimacy of the user terminal and the access right of the user terminal.

In the existing technology, the networking process and activation process of the device to be networked (that is, the aforementioned device of the Internet of Things) are not decoupled. That is, the networking process and the activation process are integrated, and the security and convenience of the activation process are not sufficient and needs improvement accordingly. Most of the works are for the purpose of personalized improvement and certain adjustments of the networking process. In addition, a user needs to trigger the networking instruction of the device to be networked through the user terminal to enable the device to be networked enter the networking process, and then determine the association relationship between the device to be networked and the user terminal.

The solution in which the above networking process and activation process are integrated has the following problems:

(1) The same networking instructions are used for different devices to be networked, and thus the security of the devices to be networked is low.
(2) Since the activation process is performed first and then the networking process is performed, the complexity of the networking process is increased, and the success rate of networking of devices to be networked is reduced.
(3) There is no time window for networking instructions, which may reduce the networking security of the devices to be networked.

In view of the above problems that the safety and reliability of the activation of the device to be networked is low due to the fact that the networking and activation of the device to be networked in the existing technology are not decoupled, no effective solution has been proposed yet.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Example embodiments of the present disclosure provide a device networking activation method, an apparatus, and a cloud network device to at least solve the technical problem of low safety and reliability of the activation of a device to be networked due to the fact that the networking and activation of the device to be networked are not decoupled in the existing technology.

According to an example embodiment of the present disclosure, a device networking activation method is provided, which comprises: networking a device to be networked; in the case where the device to be networked is successfully networked, pushing an activation strategy for activating the device to be networked to the device to be networked that has been successfully networked; and according to the activation strategy pushed, activating the device to be networked that has been successfully networked.

According to an example embodiment of the present disclosure, a device networking activation method is provided, which comprises: networking a device to be networked; in the case where the device to be networked is successfully networked, receiving an activation strategy for activating the device to be networked; and according to the received activation strategy, activating the device to be networked.

According to an example embodiment of the present disclosure, an apparatus for device networking activation is provided, and the apparatus comprises: a first networking module, which is used for networking a device to be networked; a pushing module, which is used for, in the case where the device to be networked is successfully networked, pushing an activation strategy for activating the device to be networked to the device to be networked that has been successfully networked; a first activating module, which is used for, according to the activation strategy pushed, activating the device to be networked that has been successfully networked.

According to an example embodiment of the present disclosure, a cloud network device is provided, and the cloud network device comprises the apparatus for device networking activation as mentioned above.

According to an example embodiment of the present disclosure, an apparatus for device networking activation is provided, and the apparatus comprises: a second networking module, which is used for networking a device to be networked; a receiving module, which is used for, in the case where the device to be networked is successfully networked, receiving an activation strategy for activating the device to be networked; and a second activating module, which is used for, according to the received activation strategy, activating the device to be networked.

According to an example embodiment of the present disclosure, a cloud network device is provided, and the cloud network device comprises the apparatus for device networking activation as mentioned above.

According to an example embodiment of the present disclosure, a storage medium is provided, and the storage medium comprises a stored program, wherein, when the program is running, a device where the storage medium is located is controlled to execute the device networking activation method.

According to an example embodiment of the present disclosure, a processor is provided, and the processor is used to run a program, when the program is running, the device networking activation method is executed.

In the example embodiments of the present disclosure, the decoupling of the networking process and the activation process is adopted, by connecting the device to be networked to a network, and then in the case where the device to be networked is successfully networked, the device to be networked that has been successfully networked is pushed with the activation strategy for activating the device to be networked that has been successful networked. According to the pushed activation strategy, the device to be networked that has been successful networked is activated, so as to achieve the purpose of completely decoupling the networking process and activation process of the device to be networked, thereby achieving the technical effect of improving the security of the activation process. Furthermore, the technical problem of low safety and reliability of the activation of a device to be networked caused by not decoupling the networking and activation of the device to be networked in the existing technology is solved.

BRIEF DESCRIPTION OF DRAWINGS

The drawings described herein are meant to enable a further understanding of the present disclosure and form a part of the present application. The schematic example embodiments of the present disclosure and their descriptions are used to explain the present disclosure and do not constitute an undue limitation on the present disclosure. In the drawings.

DETAILED DESCRIPTION

Figure 1:
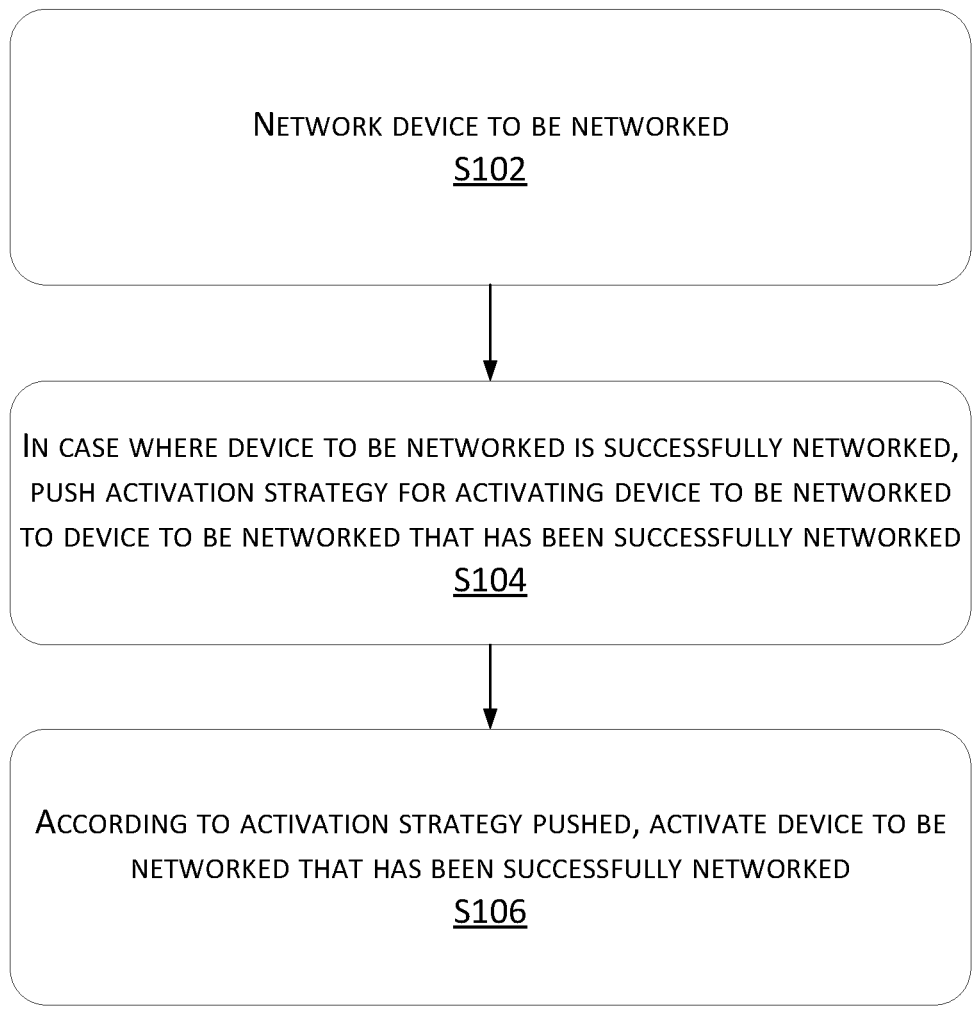
FIG. 1 is a flowchart of a device networking activation method according to an example embodiment of the present disclosure.

In order to enable a person skilled in the art to better understand the solutions of the present disclosure, the technical solutions in the example embodiments of the present disclosure will be described clearly and completely in conjunction with the drawings of the example embodiments of the present disclosure. Obviously, the described example embodiments only represent a part of the example embodiments and not all the example embodiments of the present disclosure. Based on the example embodiments of the present disclosure described herein, all other example embodiments obtained by a person of ordinary skill in the art without inventive efforts shall fall within the scope of protection of the present disclosure.

It should be noted that the terms "first" and "second" in the description and claims of the present disclosure and the above drawings are used to distinguish similar objects, and are not used to describe a specific order or sequence. It should be understood that the data so used can be interchanged under appropriate circumstances so that the example embodiments of the present disclosure described herein can be implemented in an order other than those illustrated or described herein. In addition, the terms "comprising," "including" and any variations thereof are intended to cover non-exclusive inclusions, for example, processes, methods, systems, products or devices that contain a series of steps or units need not be limited to those clearly listed steps or units, but may further include other steps or units not explicitly listed or inherent to these processes, methods, products or devices.

First, some of the nouns or terms that appear in the process of describing the example embodiments of the present application are suitable for the following explanation:

(1) Decoupling, refers to the use of a method to remove the association relationship between two or more systems.

(2) Time window, refers to a period of time during which an event or thing can be processed or reacted.

(3) Device activation, refers to the process of performing authorization binding between a user terminal and a device after the device completes networking, so that the user terminal can control the device.

According to the example embodiments of the present disclosure, an example embodiment of a device networking activation method is provided. It should be noted that the device networking activation method provided in the present application can completely decouple the networking process from the activation process so as to improve the success rate of the networking process, and at the same time enhance the security of the activation process. In addition, the activation rules in the activation process can be flexibly configured by the manufacturers, by means of comprehensively considering the characteristics of different devices to be networked, so that the convenience and security of the activation operation of the device to be networked can be improved. Finally, the activation process in the device networking activation method provided in the present application can be visualized, and the number of retries and the activation window of the activation process can be dynamically configured, thereby greatly improving the user's activation experience.

In addition, it should be noted that the device networking activation method provided in the present application can be widely used in the field of the Internet of Things. With the rapid development of science and technology, the Internet of Things technology has been widely used in people's work and daily life. For example, people can start air conditioning remotely through their mobile phones from their workplace before going back home, so that users can enjoy a comfortable environment at the moment when arriving at home. Before a user can control the air conditioner through a mobile phone, the air conditioner (that is, a device to be networked) needs to be networked and activated. According to the device networking activation method provided in the present application, the networking process and activation process of the air conditioner will be decoupled; the user can remotely control the air conditioner via the mobile phone.

In the above application scenario, as an example embodiment, FIG. 1 shows a flowchart of a device networking activation method according to an example embodiment of the present application. As shown in FIG. 1, the method, for example, includes the following steps:

Step S102 includes networking a device to be networked.

It should be noted that the above device to be networked may be, but is not limited to, a smart home device, a smart logistic device, a smart transportation device, a smart grid device, etc. that can perform the Internet of Things. In addition, the device on the cloud can decouple the networking process and activation process of the device to be networked, and execute the networking process and activation process after the decoupling process. The device located on the cloud may be, but is not limited to, a cloud server.

In addition, it should be noted that the above networking process is a process of connecting the device to be networked to a cloud server, and the above activation process is a process of activating the device to be networked. Due to the decoupling process for the networking process and activation process of the device to be networked, the networking process and activation process become independent from each other, thereby reducing the complexity of the networking process, improving the success rate of networking, and further enhancing the security of the activation process.

In an example embodiment, the device to be networked is connected through a networked device, where the networked device can be any device that has been connected to the Internet, for example, a mobile phone. In addition, the device to be networked can also be networked through an application or program installed on a networked device. For example, the networked device starts a monitoring mode to detect whether a broadcast message sent by a device to be networked is received. After the networked device receives the broadcast message sent by the device to be networked, the networked device sends the networked information to the device to be networked, and the device to be networked sends the networked information to the cloud server. After receiving the networking information, the cloud server completes the networking between the cloud server and the device to be networked.

It should be noted that in the networking process, there is no need to consider the association between the networked device and the device to be networked, as long as the networked device can obtain the broadcast message sent by the device to be networked, that is, only the networking capability of the device to be networked needs to be considered, thereby reducing the complexity of the networking process of the device to be networked and increasing the success rate of networking.

Step S104 includes, in the case where the device to be networked is successfully networked, pushing an activation strategy for activating the device to be networked to the device to be networked that has been successfully networked.

It should be noted that the manufacturer platform that provides the activation strategy of the activation process can provide the activation strategy set to the cloud server, wherein the activation strategy set includes a plurality of activation strategies, among them, each activation strategy has different configuration parameters, and the configuration parameters can be, but are not limited to, activation instructions, expiration time parameters, and other parameters. For example, the activation instructions in each activation strategy can be different.

In an example embodiment, when the device to be networked is successfully connected to the network, the cloud server pushes the activation strategy to the device to be networked according to the activation strategy set provided by the manufacturer's platform. After confirming the activation strategy, according to the activation process, the cloud server activates the device to be networked based on the activation strategy.

Step S106 includes, according to the activation strategy pushed, activating the device to be networked that has been successfully networked.

It should be noted that the activation process of the device to be networked is performed only after the device is successfully networked. This can effectively reduce the complexity of the networking process. In addition, different activation strategies correspond to different activation instructions, thereby solving the problem of reduced safety of activation of the device to be networked caused by the use of the same activation instruction for different activation strategies in the existing technology. In this way, the safety of the activation of the device to be networked is improved.

Based on the method defined in the above steps S102 to S106, it can be known that by connecting the device to be networked to the network, and then in the case where the device to be networked is successfully networked, the device to be networked is pushed with the activation strategy to activate the device to be networked, and then the device to be networked that has been successful networked can be activated according to the pushed activation strategy.

It is easy to notice that because the networking process is separated from the activation process, the networking process is executed first, and the activation process is executed only when the networking process is successful, and that this can effectively improve the networking success rate of the device to be networked, and thus improve the activation security of the device to be networked. In addition, since different activation strategies correspond to different activation instructions, the present application effectively improves the security of the activation of the device to be networked.

In addition, the example embodiments mentioned above can also achieve the purpose of completely decoupling the networking process and the activation process of the device to be networked, thereby achieving the technical effect of improving the security of the activation process, and thus solving the problem of a device to be networked in the existing technology, because the networking process and activation process of a device to be networked are not decoupled in the existing technology, so the safety and reliability of the device to be networked activation are low.

Figure 2:
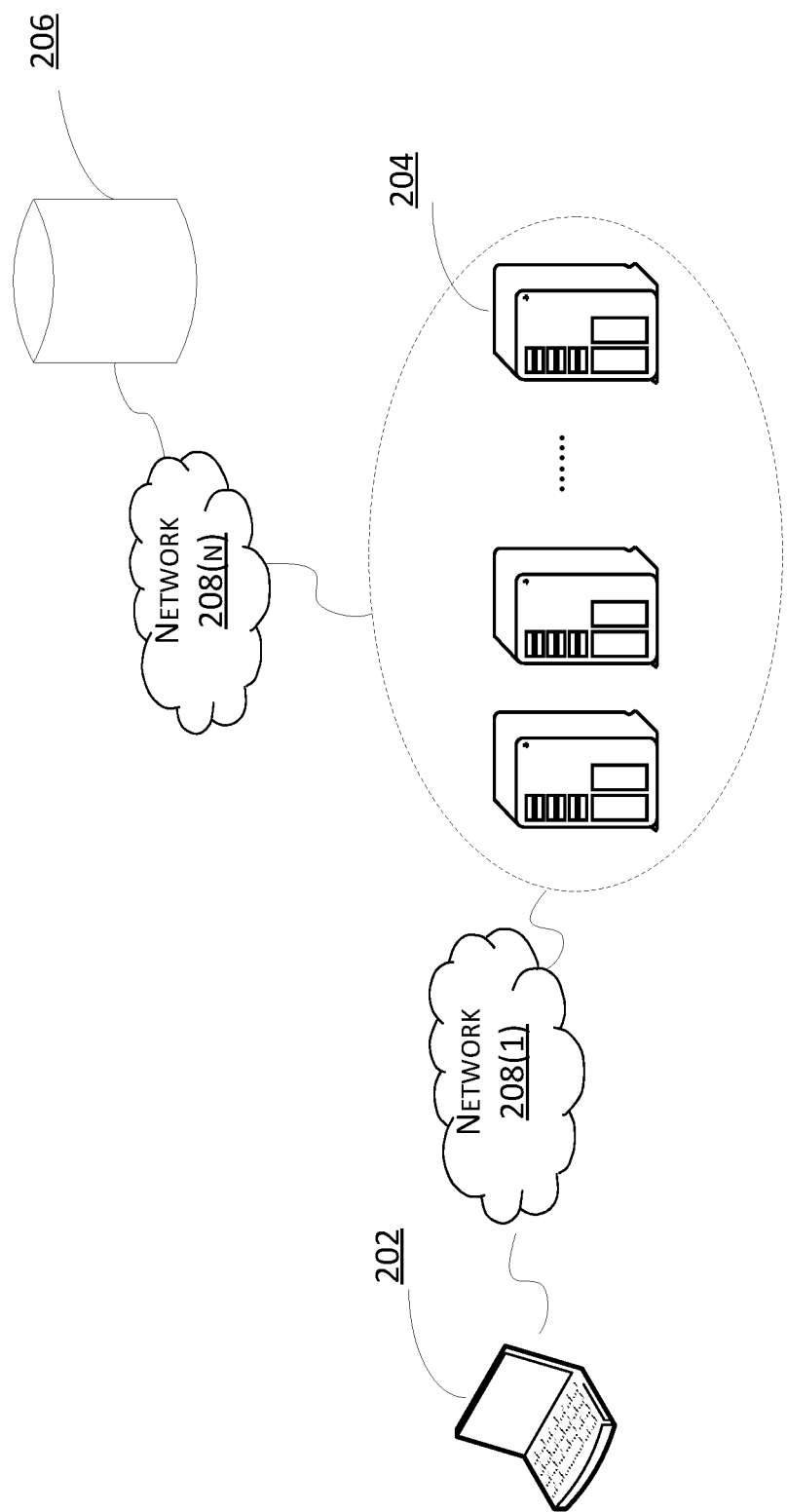
FIG. 2 is a schematic structural diagram of an optional system based on a device networking activation method according to an example embodiment of the present disclosure.

In an alternative example embodiment, FIG. 2 shows a schematic diagram of a system structure based on the device networking activation method. It can be seen from FIG. 2 that the system includes a networked device 202, one or more cloud servers 204, a device to be networked 206, and a vendor platform (not shown in FIG. 2). The networked device 202, the cloud servers 204, and the device to be networked 206 may be connected via one or more networks 208(1), . . . , 208(n), wherein n may be any integer.

The networked device 202 is used to complete the networking process of the device to be networked 206. The networked device 202 may be, but is not limited to, a smart phone, a tablet, a computer, a wearable device, such as a smart bracelet, a smart watch, and the like. The cloud server 204 may send an activation strategy to the device to be networked 206. After the user confirms the activation strategy through the device to be networked 206, the cloud server 204 then activates the device to be networked 206 based on the activation strategy. In addition, the vendor platform can push the activation strategy to the cloud server 204.

Figure 3:
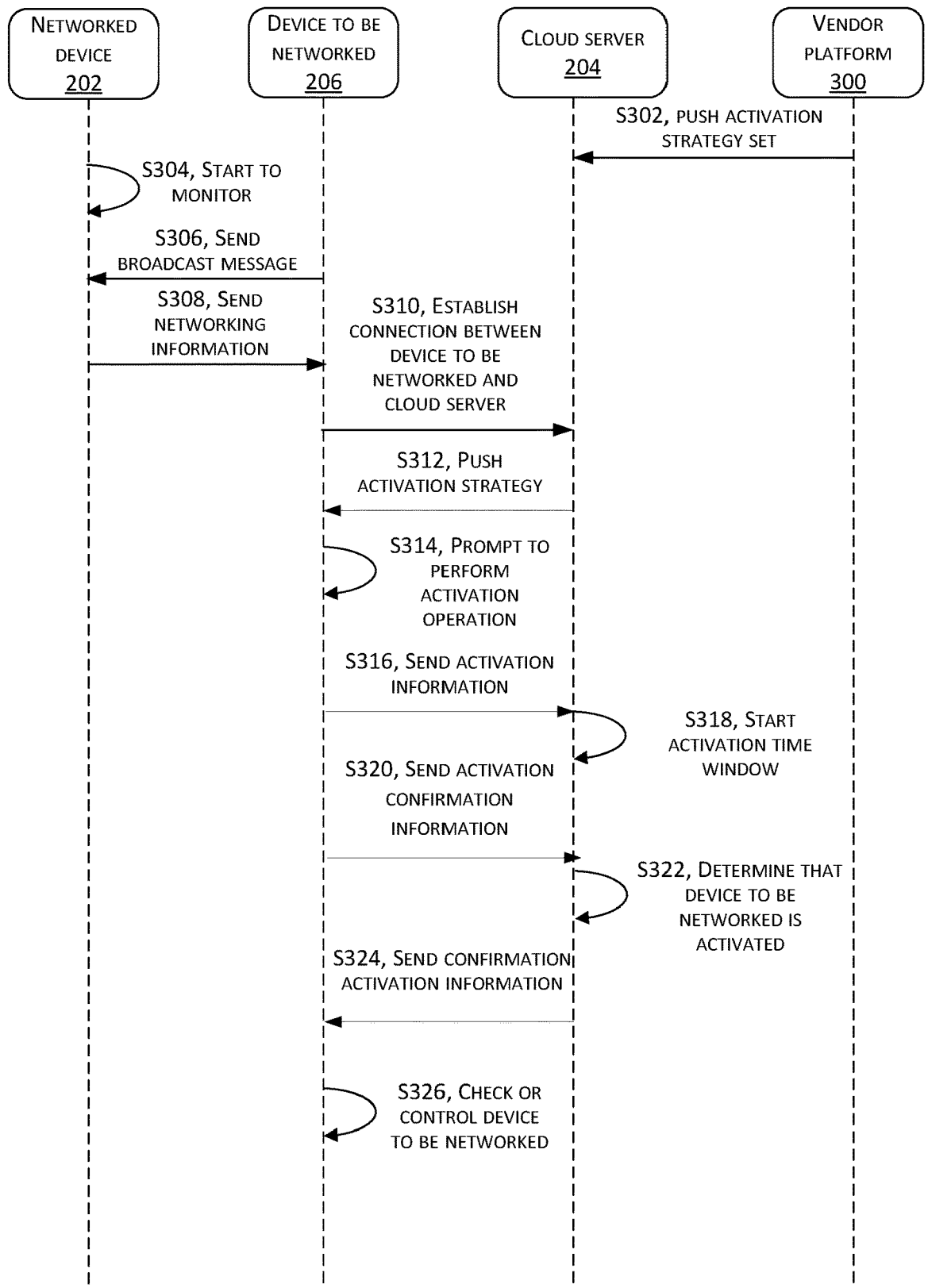
FIG. 3 is a schematic diagram of an optional interaction based on a device networking activation method according to an example embodiment of the present disclosure.

In an example embodiment, FIG. 3 shows a schematic diagram of the system interaction based on the system structure shown in FIG. 2. As can be seen from FIG. 3, the example interaction process between the networked device 202, the device to be networked 206, the cloud server 204, and the vendor platform 300 is as follows:

Step S302 includes a vendor platform pushing an activation strategy set to a cloud server.

Step S304 includes a networked device starting to monitor whether a device to be networked sends a broadcast message, wherein the networked device is a device connected to a network.

Step S306 includes the device to be networked sending a broadcast message to the networked device.

Step S308 includes the networked device sending networking information to the device to be networked.

Step S310 includes the device to be networked sending the networking information to the cloud server to establish a connection between the device to be networked and the cloud server.

Step S312 includes, after the device to be networked is successfully connected to the cloud server, the cloud server selecting an activation strategy from the activation strategy set and pushing it to the device to be networked.

Step S314 includes, after receiving the activation strategy pushed by the cloud server, the device to be networked displaying it on a display interface thereof or sending prompt information to a user in the form of a voice to prompt the user to perform an activation operation.

Step S316 includes, after viewing the prompt information through the device to be networked, the user sending activation information to the cloud server by operating with a display screen or a button of the device to be networked.

Step S318 includes, after receiving the activation information, the cloud server starting an activation time window.

Step S320 includes, the user operating the device to be networked within the activation time window to activate the device to be networked, and after the device to be networked is activated, the device to be networked sending an activation confirmation message to the cloud server to confirm that the device to be networked has been activated.

Step S322 includes, after receiving the activation confirmation message, the cloud server determining that the device to be networked is activated.

Step S324 includes, after determining that the device to be networked has been activated, the cloud server sending confirmation activation information to the device to be networked.

Step S326 includes, after receiving the confirmation activation information, the user checking the running state of the device to be networked through the display screen or the button of the device to be networked, or controlling the device to be networked to complete a corresponding action or execute a corresponding control instruction.

According to the interactive schematic diagram shown in FIG. 3, the step of pushing the activation strategy for activating the device to be networked to the device to be networked that has been successful networked includes:

determining at least one activation strategy to be pushed to the device to be networked; and selecting an activation strategy from the at least one activation strategy, and pushing the selected activation strategy to the device to be networked that has been successfully networked, and wherein when the device to be networked that has been successfully networked needs to be pushed with a respective activation strategy multiple times, the activation strategy selected each time is different.

After the device to be networked is connected to the cloud server, the cloud server can obtain the device information of the device to be networked, and according to the device information of the device to be networked, it can select an activation strategy that matches the device information of the device to be networked from an activation strategy collection containing at least a set of activation strategies, and then push the selected activation strategy to the device to be networked. In this case, the activation strategies of different devices to be networked may be different. In addition, the device information of the device to be networked may be, but is not limited to, the name, model, and identification information of the device to be networked.

In addition, it should be noted that each time the activation strategy pushed to the device to be networked is different, the activation instruction of the device to be networked is also different, and thus, the security and reliability of the activation of the device to be networked can be improved.

In addition, it should also be noted that after obtaining the activation strategy collection pushed by the vendor platform, the cloud server needs to select at least one activation strategy that can be pushed to the device to be networked from the activation strategy collection, and the example method is as follows:

obtaining at least one activation strategy for activating the device to be networked generated according to a product characteristic of the device to be networked; and determining the obtained at least one activation strategy as the at least one activation strategy to be pushed to the device to be networked.

It should be noted that the product characteristic of the device to be networked includes, but is not limited to, the device information and functional information of the device to be networked, for example, heating, dehumidification, and cooling.

For example, after establishing a connection with the device to be networked, the cloud server obtains the product characteristic of the device to be networked, and then traverses the activation strategy collection pushed by the vendor platform based on the product characteristic to obtain all activation strategies that match the product of the device to be networked. In addition, the cloud server can traverse each characteristic among the product characteristics of the device to be networked to obtain all of the activation strategies corresponding to the product characteristic of the device to be networked, and remove any repeated activation strategy, so as to obtain at least one activation strategy consistent with the product characteristic of the device to be networked.

In an alternative example embodiment, step S106, according to the activation strategy pushed, activating the device to be networked that has been successfully networked, may, for example, include the following steps:

determining an activation time window for limiting the time to activate the device to be networked; and within the determined activation time window, the device to be networked that has been successfully networked is activated according to the pushed activation strategy.

For example, after the cloud server pushes the activation strategy, the user performs activation confirmation by operating the device to be networked; the device to be networked generates activation information, and then sends the activation information to the cloud server. After receiving the activation information, the cloud server starts an activation time window to execute the activation process within the activation time window to activate the device to be networked that has been successful networked. In addition, the user can generate the activation information by operating a function key of the device to be networked. For example, by operating the "keep warm" button on a rice cooker three times in a row, or in the case where there is an activation button on the device to be networked, the user can generate the activation information by operating the activation button on the device to be networked.

It should be noted that the activation process for the device to be networked needs to be completed within a specified activation time window that has a specified period of time. If the activation process cannot be completed within the activation time window, the device to be networked activation fails to activate this time. In such a case, the user may perform multiple activation processes with the device to be networked. The example method includes the following steps:

obtaining a number of times for supporting activation retries; and within the obtained number of times, activating the device to be networked that has been successfully networked according to the pushed activation strategy.

It should be noted that the number of activation retries can be set by the user.

For example, if the activation process is not completed within the activation time window, the cloud server continues to determine whether the number of failed activation processes is greater than the present number of activation retries. If the number of failed activation processes is not greater than the preset number of activation retries, the device to be networked continues the activation process. If the number of failed activation processes is greater than the preset number of activation retries, it is determined that the activation of the device to be networked has failed.

In addition, it should also be noted that, according to the pushed activation strategy, after the activation of the device to be networked that has been successful networked, in the case where the activation of the device to be networked that has been successful networked is successful, the device to be networked is pushed with the device information of the device to be networked and the control authority of a user to control the device to be networked to the device to be networked.

For example, after the activation process is performed, the cloud server pushes the device information of the device to be networked and control authority of a user to control the device to be networked to the device to be networked. The user can view the device information of the device to be networked and the control authority of the user through the display screen of the device to be networked or a user terminal associated with the device to be networked.

It should be noted that, for the foregoing example method embodiments, for the sake of simple description, they are all expressed as a series of action combinations. However, a person skilled in the art should know that the present disclosure is not limited by the described sequence of actions. According to the present disclosure, certain steps can be performed in other orders or simultaneously. In addition, a person skilled in the art should also know that the example embodiments described in the specification are examples, and the involved actions and modules are not necessarily required by the present disclosure.

Through the description of the above example embodiments, a person skilled in the art can clearly understand that the device networking activation method according to the above example embodiments can be implemented by means of software plus a necessary general hardware platform. Of course, it may be performed through hardware. But in many cases, the former would be a better form of implementation. Based on this understanding, the technical solutions of the present disclosure, in essence, or the part thereof that contributes to the existing technology, can be embodied in the form of software products. The software products may be stored in a storage medium (such as ROM/RAM, a magnetic disk, an optical disk), and includes several instructions to enable a terminal device (which may be a mobile phone, a computer, a server, a network device, or the like) to execute the methods as described in the examples of the present disclosure.

Figure 4:
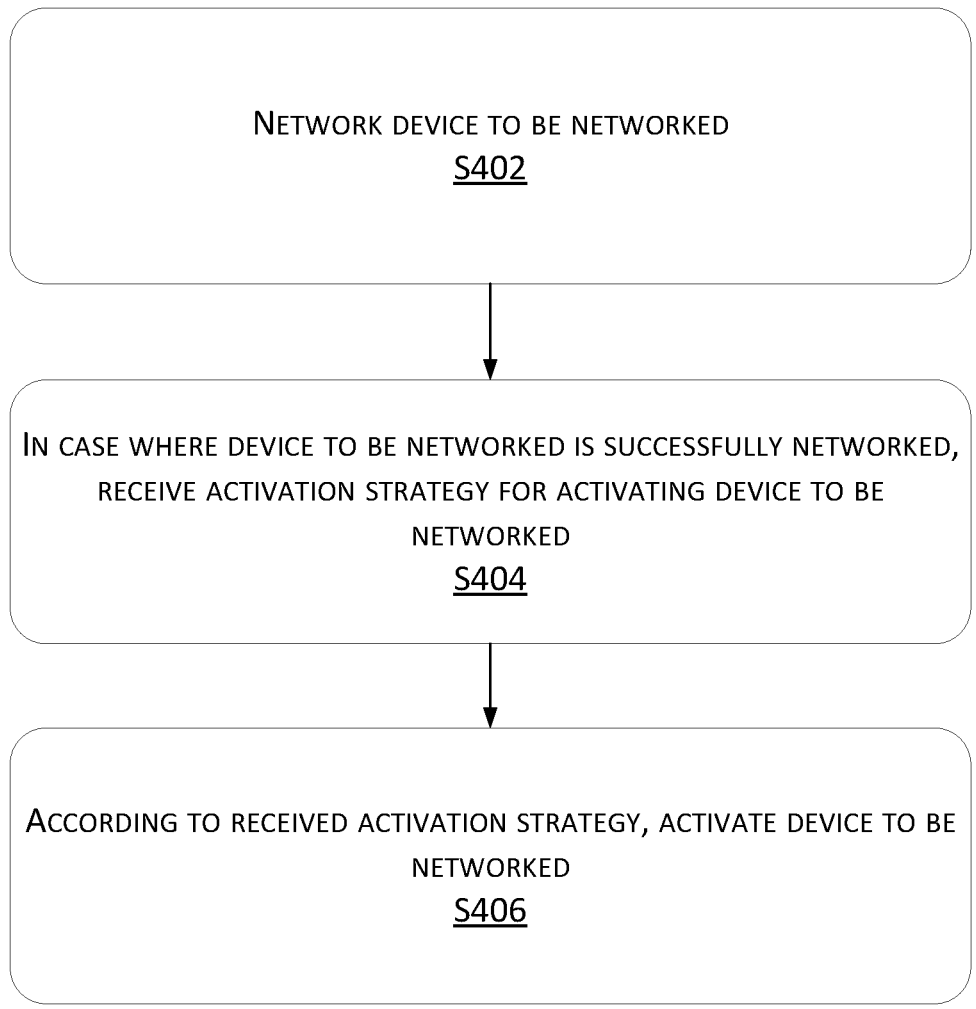
FIG. 4 is a flowchart of a device networking activation method according to an example embodiment of the present disclosure.

According to the example embodiments of the present disclosure, an example embodiment of a device networking activation method is further provided. As shown in the flowchart of the device networking activation method provided in FIG. 4, the method may include the following steps:

Step S402 includes networking a device to be networked.

It should be noted that the device to be networked can complete the networking process through a networked device. For example, the networking process can be completed through an application or program installed on a networked device. For example, the networked device starts a monitoring mode to detect whether a broadcast message sent by the device to be networked is received. After the networked device receives the broadcast message sent by the device to be networked, the networked device sends the networking information to the device to be networked, and the device to be networked then sends the networking information to the cloud server, so as to complete the networking between the cloud server and the device to be networked.

It should be noted that in the networking process, there is no need to consider the association between the networked device and the device to be networked, as long as the networked device can obtain the broadcast message sent by the device to be networked, that is, only the networking capability of the device to be networked needs to be considered, thereby reducing the complexity of the networking process of the device to be networked and increasing the success rate of networking.

Step S404 includes in the case where the device to be networked is successfully networked, receiving an activation strategy for activating the device to be networked.

It should be noted that the above prompt information may be displayed on the display screen of the device to be networked in the form of text or characters, or may be presented to the user in the form of a voice.

In addition, it should be noted that after the user obtains the activation prompt information through the device to be networked, the user may operate a touch control display of the device to be networked or a button of the device to be networked to send the activation information to the cloud server, and after receiving the activation information, the cloud server confirms the activation of the device to be networked and then sends an activation strategy to the device to be networked.

Step S406 includes, according to the received activation strategy, activating the device to be networked.

It should be noted that, after receiving the activation strategy, the device to be networked executes the activation process so as to activate the device to be networked.

Based on the method defined in the above steps S402 to S406, it can be known that by networking the device to be networked, in the case where the device to be networked is successfully networked, an activation strategy for activating the device to be networked can be received, and according to the received activation strategy, the device to be networked is then activated.

It is easy to notice that because the networking process is separated from the activation process, the networking process is executed first, and the activation process is executed only when the networking process is successful, and that this can effectively improve the networking success rate of the device to be networked, and thus improve the activation security of the device to be networked. In addition, since different activation strategies correspond to different activation instructions, the present application effectively improves the security of the activation of the device to be networked.

In addition, the example embodiments mentioned above can also achieve the purpose of completely decoupling the networking process and the activation process of the device to be networked, thereby achieving the technical effect of improving the security of the activation process, and thus solving the problem of a device to be networked in the existing technology, because the networking process and activation process of a device to be networked are not decoupled in the existing technology, so the safety and reliability of the device to be networked activation are low.

In an alternative example embodiment, Step S406, according to the received activation strategy, activating the device to be networked, includes the following example steps:

according to the received activation strategy, starting an activation time window for limiting the time to activate the device to be networked; and within the activation time window, activating the device to be networked.

In addition, the step of, within the activation time window, activating the device to be networked, includes the following example steps:

displaying operation prompt information for prompting to perform an activation authentication operation;

determining whether operation confirmation information for performing the activation authentication operation on the device to be networked is received in the activation time window; and in the case where the determining result is yes, activating the device to be networked.

For example, on the display screen of the device to be networked, the user is prompted to perform an activation authentication operation on the device to be networked, such that the user completes the activation authentication operation according to operation prompt information. For example, the activation authentication operation can be completed by operating the "keep warm" button on a rice cooker three times in a row, or operating an activation button of the device to be networked. After the activation authentication operation is completed, the device to be networked sends activation authentication operation information to the cloud server, and the cloud server then starts an activation time window. After the activation time window is started, if the device to be networked receives operation confirmation information within the activation time window, the activation process is performed to complete the activation of the device to be networked.

It should be noted that the activation process for the device to be networked needs to be completed within a specified activation time window that has a specified period of time. If the activation process cannot be completed within the activation time window, the device to be networked activation fails to activate this time. In such a case, the user may perform multiple activation processes with the device to be networked. The example method includes the following steps:

according to the received activation strategy, obtaining a number of times for supporting activation retries;

displaying the obtained number of times for supporting activation retries; and within the displayed number of times, activating the device to be networked.

For example, if the activation process is not completed within the activation time window, the cloud server continues to determine whether the number of failed activation processes is greater than the present number of activation retries. If the number of failed activation processes is not greater than the preset number of activation retries, the device to be networked continues the activation process. If the number of failed activation processes is greater than the preset number of activation retries, it is determined that the activation of the device to be networked has failed.

In addition, it should also be noted that after activating the device to be networked according to a separate activation process, if the device to be networked is activated successfully according to the separate activation process, the device to be networked is further pushed with the device information of the device to be networked and the control authority of a user to control the device to be networked to the device to be networked.

For example, after activating the device to be networked according to the received activation strategy, the method further includes the following steps:

in the case where the device to be networked is successfully activated according to the received activation strategy, receiving the pushed device information of the device to be networked and control authority of a user to control the device to be networked; and displaying the device information and the control authority received.

For example, after the activation process is performed, the cloud server pushes the device information of the device to be networked and control authority of a user to control the device to be networked to the device to be networked. The user can view the device information of the device to be networked and the control authority of the user through the display screen of the device to be networked or a user terminal associated with the device to be networked.

Figure 5:
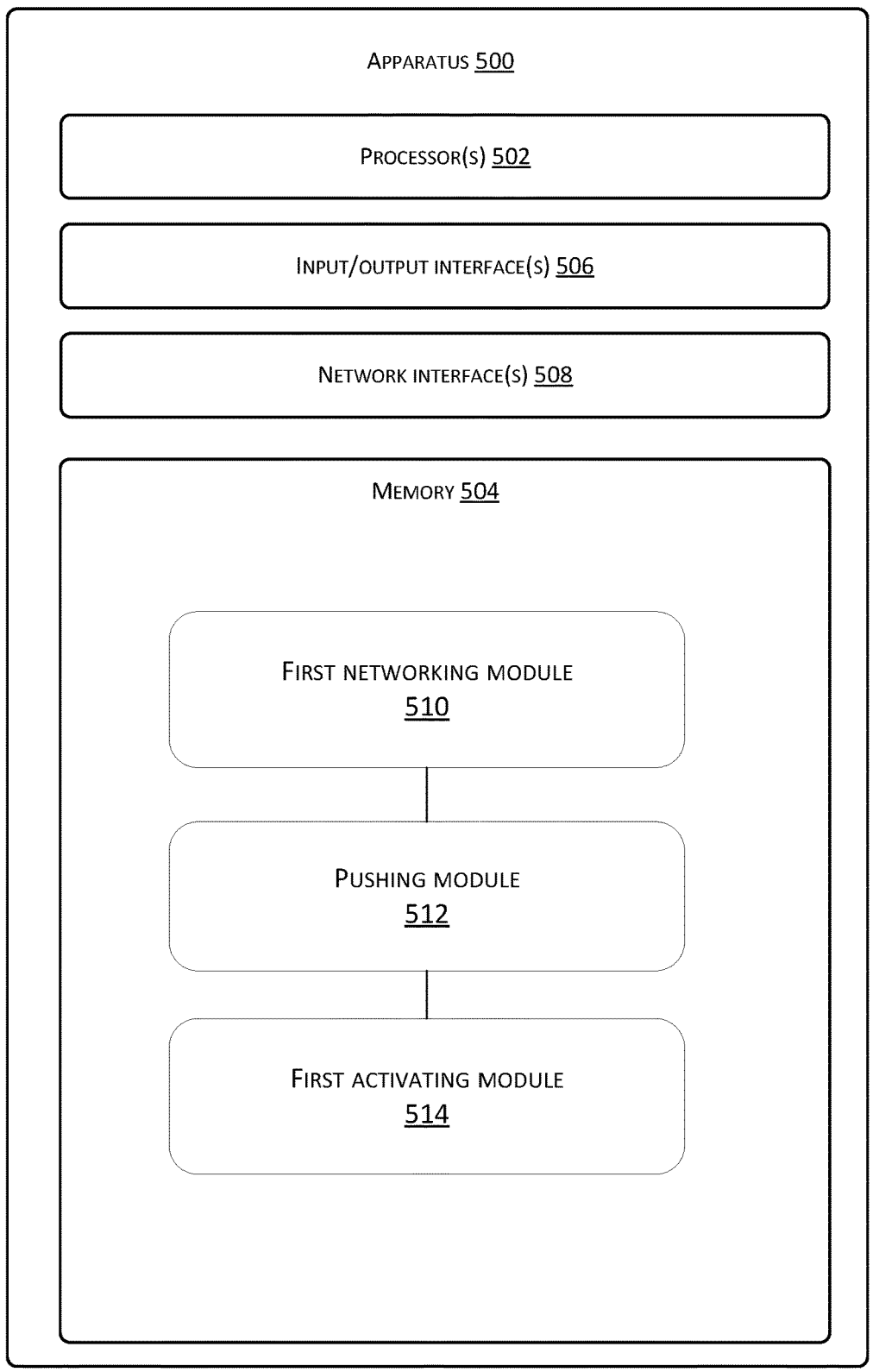
FIG. 5 is a schematic structural diagram of an apparatus for device networking activation according to an example embodiment of the present disclosure.

According to the example embodiments of the present disclosure, an apparatus for device networking activation for implementing the device networking activation method of the above example embodiment 1 is further provided. As shown in FIG. 5, the apparatus 500 includes one or more processor(s) 502 or data processing unit(s) and memory 504. The apparatus 500 may further include one or more input/output interface(s) 506 and one or more network interface(s) 508. The memory 504 is an example of computer readable media.

The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 504 may store therein a plurality of modules or units including a first networking module 510, a pushing module 512, and a first activating module 514.

The first networking module 510 is used for networking a device to be networked. The pushing module 512 is used for, in the case where the device to be networked is successfully networked, pushing an activation strategy for activating the device to be networked to the device to be networked that has been successfully networked. The first activating module 514 is used for, according to the activation strategy pushed, activating the device to be networked that has been successfully networked.

It should be noted herein that the above-mentioned first networking module 510, pushing module 512, and first activating module 514 correspond to steps S102 to S106 in the example method embodiment. In addition, the three modules have the same examples and application scenarios as the corresponding steps, but are not limited to the contents disclosed in the example method embodiment.

In an example embodiment, the pushing module 512 includes: a first determining module and a first pushing module. Among them, the first determining module is used for determining at least a set of activation strategies to be pushed to the device to be networked; and the first pushing module is used for selecting an activation strategy from the at least a set of activation strategies, and pushing the selected activation strategy to the device to be networked that has been successfully networked, wherein when the device to be networked that has been successfully networked needs to be pushed with a respective activation strategy multiple times, the activation strategy selected each time is different.

It should be noted herein that the first determining module and the first pushing module perform the following steps respectively in the example method embodiment:
  determining at least one activation strategy to be pushed to the device to be networked; and
  selecting an activation strategy from the at least one activation strategy, and pushing the selected activation strategy to the device to be networked that has been successfully networked, and wherein when the device to be networked that has been successfully networked needs to be pushed with a respective activation strategy multiple times, the activation strategy selected each time is different.

In addition, the two modules have the same examples and application scenarios as the corresponding steps, but are not limited to the contents disclosed in the example method embodiment.

In an example embodiment, the first determining module includes: a first obtaining module and a second pushing module. Among them, the first obtaining module is used for obtaining at least one activation strategy for activating the device to be networked generated according to a product characteristic of the device to be networked; and the second pushing module is used for determining the obtained at least one activation strategy as the at least one activation strategy to be pushed to the device to be networked.

It should be noted herein that the first determining module and the second pushing module perform the following steps respectively in the example method embodiment:
  obtaining at least one activation strategy for activating the device to be networked generated according to a product characteristic of the device to be networked; and
  determining the obtained at least one activation strategy as the at least one activation strategy to be pushed to the device to be networked.

In addition, the two modules have the same examples and application scenarios as the corresponding steps, but are not limited to the contents disclosed in the example method embodiment.

In an example embodiment, the first activating module includes a second determining module and a second activating module. Among them, the first activating module is used for determining an activation time window for limiting the time to activate the device to be networked; and the second activating module is used for, within the determined activation time window, activating the device to be networked that has been successfully networked according to the pushed activation strategy.

It should be noted herein that the second determining module and the second activating module may perform the following steps respectively in the example method embodiment:
  determining an activation time window for limiting the time to activate the device to be networked; and
  within the determined activation time window, the device to be networked that has been successfully networked is activated according to the pushed activation strategy.

In addition, the two modules have the same examples and application scenarios as the corresponding steps, but are not limited to the contents disclosed in the example method embodiment.

In an example embodiment, the first activating module includes a second obtaining module and a third activating module. Among them, the second obtaining module is used for obtaining a number of times for supporting activation retries; and the third activating module is used for, within the obtained number of times, activating the device to be networked that has been successfully networked according to the pushed activation strategy.

It should be noted herein that the second obtaining module and the third activating module perform the following steps respectively in the example method embodiment:
  obtaining a number of times for supporting activation retries; and
  within the obtained number of times, activating the device to be networked that has been successfully networked according to the pushed activation strategy.

In addition, the two modules have the same examples and application scenarios as the corresponding steps, but are not limited to the contents disclosed in the example method embodiment.

In an example embodiment, the apparatus for device networking activation further includes: a third pushing module, wherein the third pushing module is used for, in the case where the device to be networked that has been successfully networked is activated successfully, pushing device information of the device to be networked and control authority of a user to control the device to be networked to the device to be networked.

According to the example embodiments of the present disclosure, a cloud network device is further provided, which includes the apparatus for device networking activation as described in the foregoing example apparatus embodiment.

Figure 6:
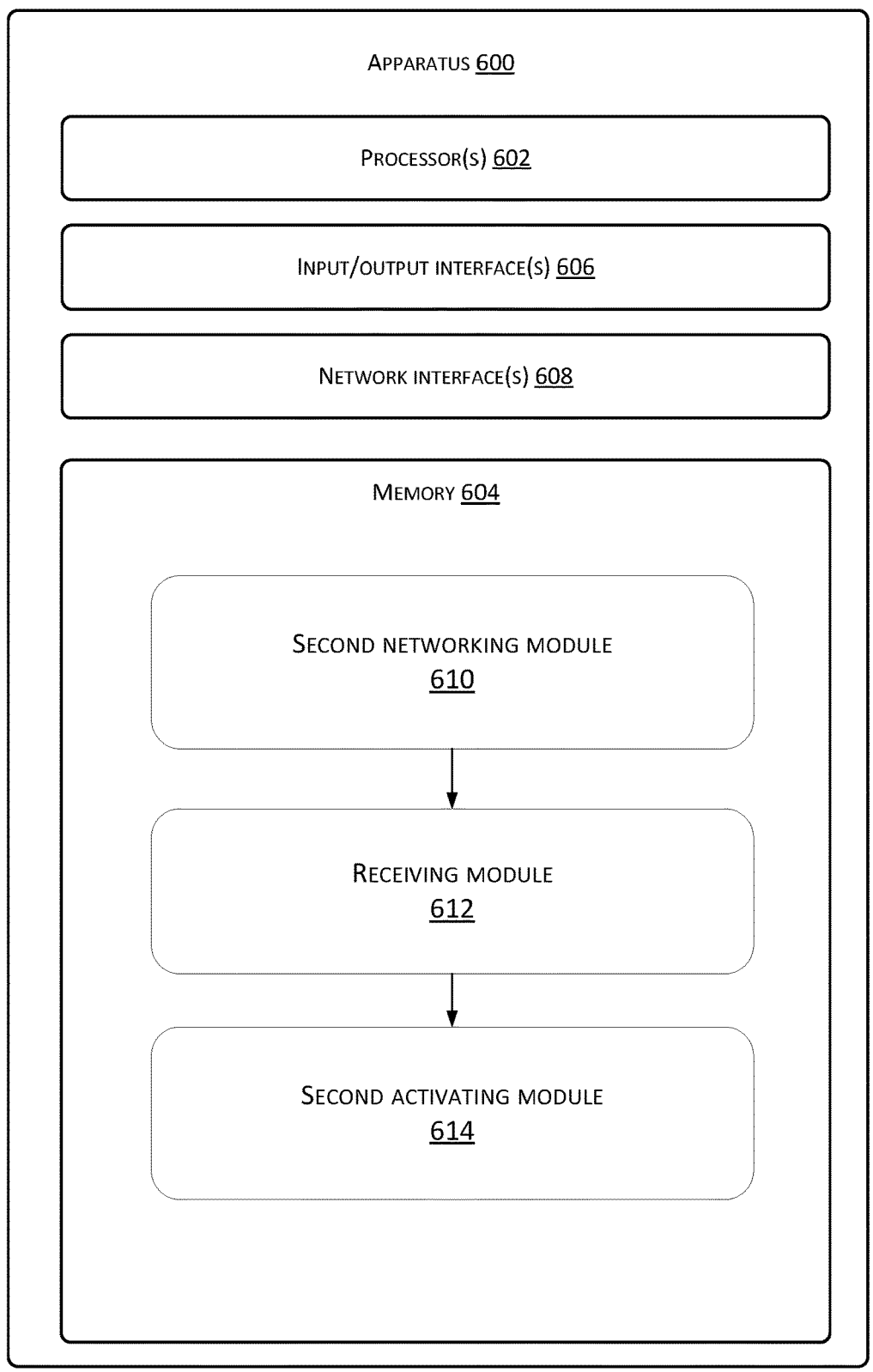
FIG. 6 is a schematic structural diagram of an apparatus for device networking activation according to an example embodiment of the present disclosure.

According to the example embodiments of the present disclosure, the present disclosure further provides an apparatus for device networking activation for implementing the device networking activation method of the above example method embodiment. As shown in FIG. 6, the apparatus 600 includes one or more processor(s) 602 or data processing unit(s) and memory 604. The apparatus 600 may further include one or more input/output interface(s) 606 and one or more network interface(s) 608. The memory 604 is an example of computer readable media.

The memory 604 may store therein a plurality of modules or units including a second networking module 610, a receiving module 612, and a second activating module 614.

The second networking module 610 is used for networking a device to be networked; the receiving module 612 is used for, in the case where the device to be networked is successfully networked, receiving an activation strategy for activating the device to be networked; and the second activating module 614 is used for, according to the received activation strategy, activating the device to be networked.

It should be noted herein that the above-mentioned second networking module 610, receiving module 612, and second activating module 614 correspond to steps S402 to S406 in the example method embodiment. In addition, the three modules have the same examples and application scenarios as the corresponding steps, but are not limited to the contents disclosed in the example method embodiment.

In an example embodiment, the second networking module includes: a starting unit and a second activating unit, wherein the starting unit is used for, according to the received activation strategy, starting an activation time window for limiting the time to activate the device to be networked; and the second activating unit is used for, within the activation time window, activating the device to be networked.

It should be noted herein that the starting unit and the second activating unit perform the following steps respectively in the example method embodiment:
  according to the received activation strategy, starting an activation time window for limiting the time to activate the device to be networked; and
  within the activation time window, activating the device to be networked.

In addition, the two modules have the same examples and application scenarios as the corresponding steps, but are not limited to the contents disclosed in the example method embodiment.

In an example embodiment, the second activating unit includes a first displaying subunit, a determining subunit, and a third activating subunit. Among them, the first displaying subunit is used for displaying operation prompt information for prompting to perform an activation authentication operation; the determining subunit is used for determining whether operation confirmation information for performing the activation authentication operation on the device to be networked is received in the activation time window; and the third activating subunit is used for, in the case where the determining result is yes, activating the device to be networked.

It should be noted herein that the first displaying subunit, the determining subunit, and the third activating subunit perform the following steps respectively in the example method embodiment:
  displaying operation prompt information for prompting to perform an activation authentication operation;
  determining whether operation confirmation information for performing the activation authentication operation on the device to be networked is received in the activation time window; and
  in the case where the determining result is yes, activating the device to be networked.

In addition, the two modules have the same examples and application scenarios as the corresponding steps, but are not limited to the contents disclosed in the example method embodiment.

In an example embodiment, the second activating module includes: an obtaining unit, a displaying unit, and a third activating unit. Among them, the obtaining unit is used for obtaining a number of times for supporting activation retries; the displaying unit is used for displaying the obtained number of times for supporting activation retries, and the third activating unit is used for, within the obtained number of times, activating the device to be networked that has been successfully networked according to the pushed activation strategy.

It should be noted herein that the obtaining unit, the displaying unit, and the third activating unit perform the following steps respectively in the example method embodiment:
  according to the received activation strategy, obtaining a number of times for supporting activation retries;
  displaying the obtained number of times for supporting activation retries; and
  within the displayed number of times, activating the device to be networked.

In addition, the three modules have the same examples and application scenarios as the corresponding steps, but are not limited to the contents disclosed in the example method embodiment.

In an example embodiment, the apparatus for device networking activation also includes: a second receiving module and a second displaying module. Among them, the second receiving module is used for, in the case where the device to be networked is successfully activated according to the received activation strategy, receiving the pushed device information of the device to be networked and control authority of a user to control the device to be networked; and the second displaying module is used for displaying the device information and the control authority received.

It should be noted herein that the second receiving module and the second displaying module perform the following steps respectively in the example method embodiment:
  in the case where the device to be networked is successfully activated according to the received activation strategy, receiving the pushed device information of the device to be networked and control authority of a user to control the device to be networked; and displaying the device information and the control authority received In addition, the two modules have the same examples and application scenarios as the corresponding steps, but are not limited to the contents disclosed in the example method embodiment.

According to the example embodiments of the present disclosure, the present disclosure further provides a cloud network device, including the apparatus for device networking activation in the foregoing example apparatus embodiment.

An example embodiment of the present disclosure may provide a computer terminal, and the computer terminal may be any computer terminal device in a computer terminal group. For example, in this example embodiment, the above computer terminal may also be replaced with a terminal device such as a mobile terminal.

For example, in this example embodiment, the foregoing computer terminal may be located in at least one network device among a plurality of network devices in a computer network.

In this example embodiment, the above computer terminal can execute the program code of the following steps in the device networking activation method of the application program: networking a device to be networked; in the case where the device to be networked is successfully networked, pushing an activation strategy for activating the device to be networked to the device to be networked that has been successfully networked; and according to the activation strategy pushed, activating the device to be networked that has been successfully networked.

Figure 7:
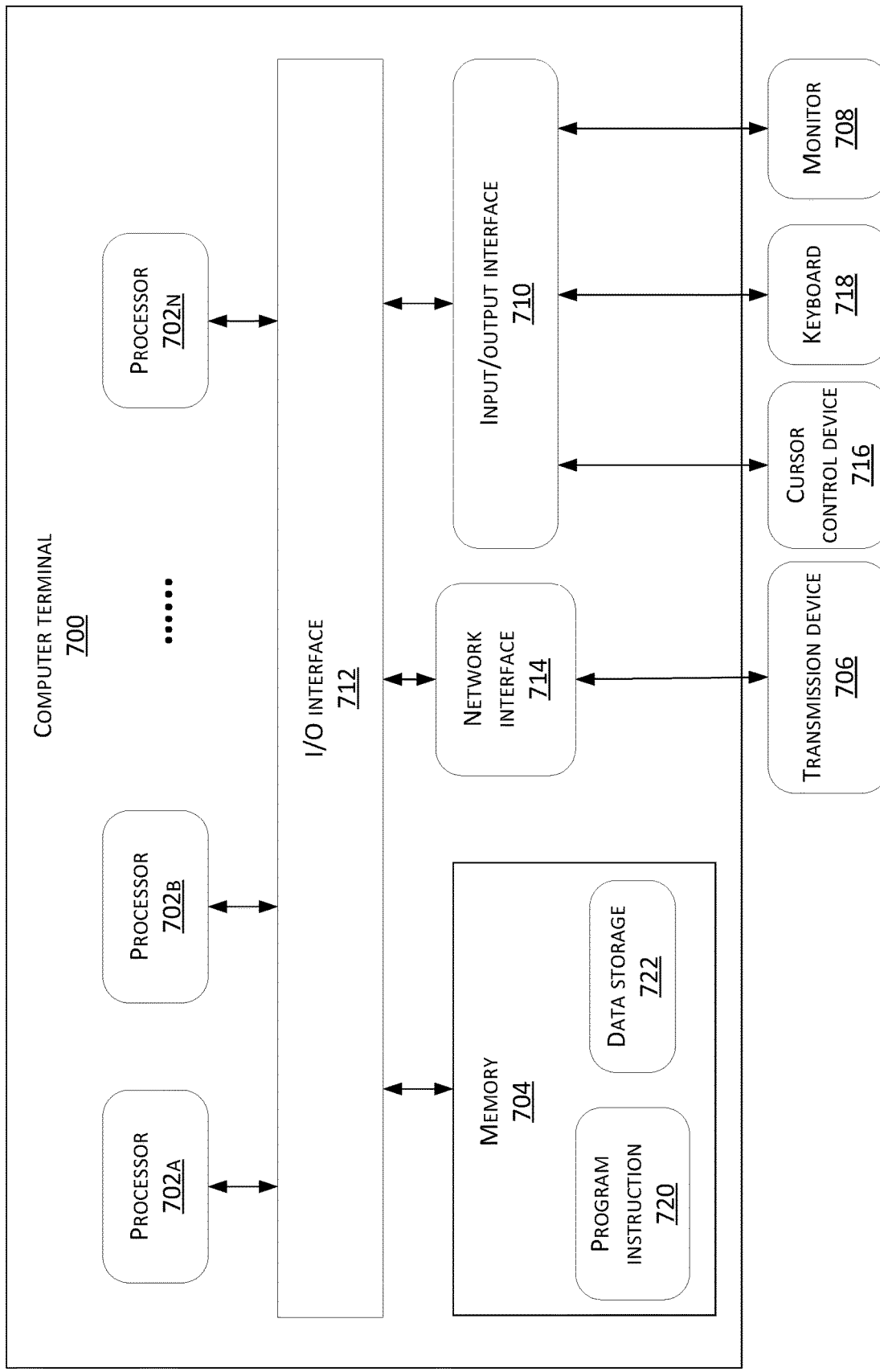
FIG. 7 is a block diagram of a hardware structure of a computer terminal according to an example embodiment of the present disclosure.

FIG. 7 shows a hardware block diagram of a computer terminal 700. As shown in FIG. 7, the computer terminal 700 may include one or more processors 702 (shown as 702a, 702b, . . . , 702n in the figure) (the processor 702 may include, but is not limited to, a microprocessor MCU or a processing device such as a programmable logic device FPGA), a memory 704 for storing data, and a transmission device 706 for a communication function. In addition, the computer terminal 700 may also include: a display such as a monitor 708, an input/output interface 710 (I/O interface), a universal serial bus (USB) port (which can be included as one of the ports of the I/O interface 712), a network interface 714, a power supply and/or a camera (not shown in FIG. 7). The input/output interface 710 may be also connected with other inputting devices such as a cursor control device 716 and a keyboard 718.

A person of ordinary skill in the art would understand that the structure shown in FIG. 7 is merely an illustration, which does not limit the structure of the above electronic device. For example, the computer terminal 700 may also include more or fewer components than those shown in FIG. 7 or have a configuration different from that shown in FIG. 7.

It should be noted that the aforementioned one or more processors 702 and/or other data processing circuits may generally be referred to herein as "data processing circuits." A data processing circuit may be fully or partially embodied as software, hardware, firmware, or any other combination thereof. In addition, the data processing circuit may be a single independent processing module, or may be wholly or partially integrated into any one of other elements in the computer terminal 700. As mentioned in the example embodiments of the present application, the data processing circuit serves as a kind of processor control (for example, the selection of a variable resistance terminal path connected to an interface).

The processor 702 can call the information and application programs stored in the memory through the transmission device to perform the following steps: networking a device to be networked; in the case where the device to be networked is successfully networked, pushing an activation strategy for activating the device to be networked to the device to be networked that has been successfully networked; and according to the activation strategy pushed, activating the device to be networked that has been successfully networked.

The memory 704 may be used to store software programs and modules of application software, such as program instruction 720 or computer-readable instructions/data storage device 722 corresponding to the device networking activation method in the example embodiments of the present application, and the processor 702 runs the software programs and modules stored in the memory 704, thereby performing various functional applications and data processing, that is, implementing the above-mentioned device networking activation method. The memory 704 may include a high-speed random access memory, and may also include a nonvolatile memory, such as one or more magnetic storage devices, flash memory, or other nonvolatile solid-state memory. In some examples, the memory 704 may further include memories remotely provided with respect to the processor 702, and these remote memories may be connected to the computer terminal 700 through a network. Examples of the above network include but are not limited to the Internet, an intranet, a local area network, a mobile communication network, and combinations thereof.

The transmission device 706 is used to receive or send data via a network. The above example of the network may include a wireless network provided by the communication provider of the computer terminal 700. In one example, the transmission device 706 includes a network adapter (Network Interface Controller, NIC), which can be connected to other network devices through a base station to communicate with the Internet. In one example, the transmission device 706 may be a radio frequency (Radio Frequency, RF) module, which is used to communicate with the Internet in a wireless manner.

The display may be, for example, a touch screen type liquid crystal display (LCD), which may enable a user to interact with the user interface of the computer terminal 700.

It should be noted herein that, in some example embodiments, the computer terminal 700 shown in FIG. 7 may include hardware elements (including circuits), software elements (including computer code stored on a computer-readable medium), or a combination of hardware and software components. It should be noted that FIG. 7 is only an example, and is intended to show the types of components that can be present in the computer terminal 700 as described above.

In this example embodiment, the computer terminal 700 can execute the program code of the following steps in the device networking activation method of the application program: networking a device to be networked; in the case where the device to be networked is successfully networked, pushing an activation strategy for activating the device to be networked to the device to be networked that has been successfully networked; and according to the activation strategy pushed, activating the device to be networked that has been successfully networked.

The processor can call the information and application stored in the memory through the transmission device to perform the following steps: determining at least one activation strategy to be pushed to the device to be networked; and selecting an activation strategy from the at least one activation strategy, and pushing the selected activation strategy to the device to be networked that has been successfully networked, wherein when the device to be networked that has been successfully networked needs to be pushed with a respective activation strategy multiple times, the activation strategy selected each time is different.

For example, the above processor may also execute the program code of the following steps: obtaining at least one activation strategy for activating the device to be networked generated according to a product characteristic of the device to be networked; and determining the obtained at least one activation strategy as the at least one activation strategy to be pushed to the device to be networked.

For example, the above processor may also execute the program code of the following steps: determining an activation time window for limiting the time to activate the device to be networked; and within the determined activation time window, activating the device to be networked that has been successfully networked according to the pushed activation strategy.

For example, the above processor may also execute the program code of the following steps: obtaining a number of times for supporting activation retries; and within the obtained number of times, activating the device to be networked that has been successfully networked according to the pushed activation strategy.

For example, the above processor may also execute the program code of the following steps: in the case where the device to be networked that has been successfully networked is activated successfully, pushing device information of the device to be networked and control authority of a user to control the device to be networked to the device to be networked.

A person of ordinary skill in the art would understand that the structure shown in FIG. 7 is merely an illustration, and the computer terminal may also be a smartphone (such as an Android phone, an iOS phone, and the like), a tablet computer, a palm computer, a mobile Internet device (MID), a PAD or another terminal device. FIG. 7 does not limit the structure of the above electronic device. For example, the computer terminal 700 may also include more or fewer components than those shown in FIG. 7 (such as a network interface, a display device, and the like), or have a configuration different from that shown in FIG. 7.

A person of ordinary skill in the art would understand that all or part of the steps in the various methods of the above example embodiments may be completed by instructing hardware related to the terminal device through a program. The program may be stored in a computer-readable storage medium, which may include: a flash disk, a Read-Only Memory (ROM), a Random Access Memory (RAM), a magnetic disk, an optical disk, or the like.

The example embodiments of the present disclosure also provide a storage medium. For example, in this example embodiment, the storage medium may be used to store the program code executed by the device networking activation method provided in the above the example method embodiment.

For example, in this example embodiment, the above storage medium may be located in any computer terminal in the computer terminal group in a computer network, or in any mobile terminal in a mobile terminal group.

For example, in this example embodiment, the storage medium is set to store program code for performing the following steps: networking a device to be networked; in the case where the device to be networked is successfully networked, pushing an activation strategy for activating the device to be networked to the device to be networked that has been successfully networked; and according to the activation strategy pushed, activating the device to be networked that has been successfully networked.

For example, in this example embodiment, the storage medium is set to store the program code for performing the following steps: determining at least one activation strategy to be pushed to the device to be networked; and selecting an activation strategy from the at least one activation strategy, and pushing the selected activation strategy to the device to be networked that has been successfully networked, wherein when the device to be networked that has been successfully networked needs to be pushed with a respective activation strategy multiple times, the activation strategy selected each time is different.

For example, in this example embodiment, the storage medium is set to store the program code for performing the following steps: obtaining at least one activation strategy for activating the device to be networked generated according to a product characteristic of the device to be networked; and determining the obtained at least one activation strategy as the at least one activation strategy to be pushed to the device to be networked.

For example, in this example embodiment, the storage medium is set to store the program code for performing the following steps: determining an activation time window for limiting the time to activate the device to be networked; and within the determined activation time window, activating the device to be networked that has been successfully networked according to the pushed activation strategy.

For example, in this example embodiment, the storage medium is set to store the program code for performing the following steps: obtaining a number of times for supporting activation retries; and within the obtained number of times, activating the device to be networked that has been successfully networked according to the pushed activation strategy.

For example, in this example embodiment, the storage medium is set to store the program code for performing the following steps: in the case where the device to be networked that has been successfully networked is activated successfully, pushing device information of the device to be networked and control authority of a user to control the device to be networked to the device to be networked.

The sequence numbers of the above example embodiments of the present disclosure are for description only, and do not represent the advantages and disadvantages of the example embodiments.

In the above example embodiments of the present disclosure, the description of each example embodiment has its own emphasis. For a part that is not detailed in an example embodiment, it can be referred to the related descriptions in other example embodiments.

In the several example embodiments provided in the present application, it should be understood that the disclosed technical contents may be implemented in other ways. The device example embodiments described above are only schematic. For example, the division of the unit is only a logical function division. In actual implementation, there may be another division manner, for example, multiple units or components may be combined or integrated into another system, or some features can be ignored, or not implemented. In addition, the displayed or discussed coupling or direct coupling or communication connection may be indirect coupling or communication connection through some interfaces, units or modules, and may be in electrical or other forms.

The units described as separate components may or may not be physically separated, and the components displayed as units may or may not be physical units, that is, they can be located in one place, or can be distributed on multiple network elements. Some or all of the units may be selected according to actual needs to achieve the purpose of the solution of the example embodiment.

In addition, each functional unit in each example embodiment of the present disclosure may be integrated into one processing unit, or each unit may exist alone physically, or two or more units may be integrated into one unit. The integrated unit can be implemented in the form of hardware or software function units.

If the integrated unit is implemented in the form of a software functional unit and sold or used as an independent product, it may be stored in a computer-readable storage medium. Based on this understanding, the technical solution of the present disclosure essentially, or as a part thereof that makes contribution to the existing technology, or all or part of the technical solution can be embodied in the form of a software product, and such a software product is stored in a storage medium, which includes several instructions to enable a computer device (which may be a personal computer, a server, a network device, etc.) to perform all or part of the steps of the methods described in various example embodiments of the present disclosure. The foregoing storage media include: a USB disk, a read-only memory (ROM), a random access memory (RAM), a mobile hard disk, a magnetic disk, an optical disk and other media that can store program codes.

The above are only some example embodiments of the present disclosure. It should be noted that for a person of ordinary skill in the art, without departing from the principles of the present disclosure, several improvements or modifications can be made, and these improvements and modifications should also be regarded as within the scope of protection of the present disclosure.

The present disclosure may further be understood with clauses as follows.

Clause 1. A device networking activation method comprising:
  networking a device to be networked;
  in response to determining that the device to be networked is successfully networked, pushing an activation strategy for activating the device to be networked to the device to be networked that has been successfully networked; and
  activating the device to be networked that has been successfully networked according to the pushed activation strategy.

Clause 2. The method according to clause 1, wherein the pushing the activation strategy for activating the device to be networked to the device to be networked that has been successfully networked comprises:
  determining at least one activation strategy to be pushed to the device to be networked; and
  selecting the activation strategy from the at least one activation strategy, and pushing the selected activation strategy to the device to be networked that has been successfully networked, wherein when the device to be networked that has been successfully networked needs to be pushed with a respective activation strategy multiple times, the respective activation strategy selected each time is different.

Clause 3. The method according to clause 2, wherein the determining at least one activation strategy to be pushed to the device to be networked comprises:
  obtaining at least one activation strategy for activating the device to be networked generated according to a product characteristic of the device to be networked; and
  determining the obtained at least one activation strategy as the at least one activation strategy to be pushed to the device to be networked.

Clause 4. The method according to clause 1, wherein the activating the device to be networked that has been successfully networked according to the pushed activation strategy comprises:
  determining an activation time window for limiting a time to activate the device to be networked; and
  activating the device to be networked that has been successfully networked within the determined activation time window according to the pushed activation strategy.

Clause 5. The method according to clause 1, wherein the activating the device to be networked that has been successfully networked according to the pushed activation strategy comprises:
  obtaining a number of times for supporting activation retries; and
  activating the device to be networked that has been successfully networked within the obtained number of times according to the pushed activation strategy.

Clause 6. The method according to any one of clauses 1 to 5, wherein after the activating the device to be networked that has been successfully networked according to the pushed activation strategy, the method further comprises:
  in response to determining that the device to be networked that has been successfully networked is activated successfully, pushing device information of the device to be networked and control authority of a user to control the device to be networked to the device to be networked.

Clause 7. A device networking activation method comprising:
  networking a device to be networked;
  in response to determining that the device to be networked is successfully networked, receiving an activation strategy for activating the device to be networked; and
  activating the device to be networked according to the received activation strategy.

Clause 8. The method according to clause 7, wherein the activating the device to be networked according to the received activation strategy comprises:
  starting an activation time window for limiting the time to activate the device to be networked according to the received activation strategy; and
  activating the device to be networked within the activation time window.

Clause 9. The method according to clause 8, wherein the activating the device to be networked within the activation time window comprises:
  displaying operation prompt information for prompting to perform an activation authentication operation;
  determining whether operation confirmation information for performing the activation authentication operation on the device to be networked is received in the activation time window; and
  in response to determining that the operation confirmation information for performing the activation authentication operation on the device to be networked is received in the activation time window, activating the device to be networked.

Clause 10. The method according to clause 7, wherein the activating the device to be networked according to the received activation strategy comprises:
obtaining a number of times for supporting activation retries according to the received activation strategy;
displaying the obtained number of times for supporting activation retries; and
activating the device to be networked within the displayed number of times.

Clause 11. The method according to any one of clauses 7 to 10, wherein after the activating the device to be networked according to the received activation strategy, the method further comprises:
in response to determining that the device to be networked is successfully activated according to the received activation strategy, receiving pushed device information of the device to be networked and control authority of a user to control the device to be networked; and
displaying the device information and the control authority received.

Clause 12. An apparatus for device networking activation, the apparatus comprising:
a first networking module that networks a device to be networked;
a pushing module that, in the case where the device to be networked is successfully networked, pushes an activation strategy for activating the device to be networked to the device to be networked that has been successfully networked; and
a first activating module that activates the device to be networked that has been successfully networked according to the activation strategy pushed.

Clause 13. A cloud network device comprising the apparatus for device networking activation according to claim 12.

Clause 14. An apparatus for device networking activation comprising:
a second networking module that networks a device to be networked;
a receiving module that, in the case where the device to be networked is successfully networked, receives an activation strategy for activating the device to be networked; and
a second activating module that activating the device to be networked according to the received activation strategy.

Clause 15. A device to be networked comprising the apparatus for device networking activation according to claim 14.

Clause 16. A storage medium comprising a stored program, wherein, when the program is running, a device where the storage medium is located is controlled to execute the device networking activation method according to any one of claims 1 to 11.

Clause 17. A processor comprising: when the processor runs a program, the processor executes the device networking activation method according to any one of claims 1 to 11.

What is claimed is:

1. A method comprising:
decoupling a process of activating a device from a process of networking the device, the decoupling comprising removing an association relationship between the process of activating the device and the process of networking the device;
performing the process of networking the device, the process of networking the device comprising:
connecting the device to a network, the device comprising an Internet of Things device; and
determining that the device is successfully networked; and
performing the process of activating the device only after the process of networking the device is performed and successful, the process of activating the device comprising:
pushing a plurality of different activation strategies for activating the device to the device through an established connection after the device is successfully networked; and
attempting to activate the device according to a first activation strategy of the plurality of different activation strategies within a first preset activation time window through the established connection, wherein:
the first activation strategy is obtained based at least in part on device information and functional information of the device, the device information comprising a name of the device, a model of the device, and identification information of the device, and the functional information comprising at least one of heating, dehumidification, or cooling; and
activating the device comprising performing an authorization binding between a user terminal and the device after the device is successfully networked to enable the user terminal to control the device, wherein: if the device fails to be activated according to the first activation strategy within the first preset activation time window and a number of attempting to activate the device is within a preset number of times for supporting activation retries, attempting to activate the device according to a second activation strategy having a different expiration time parameter and a different activation instruction from the first activation strategy is performed within a second preset activation time window through the established connection, the second preset activation time window being after the first preset activation time window, and wherein the process of activating the device fails if the number of attempting to activate the device is more than the preset number of times for supporting the activation retires.

2. The method according to claim 1, wherein prior to pushing the plurality of different activation strategies for activating the device to the device, the method further comprises:
determining multiple activation strategies to be pushed to the device; and
selecting the plurality of different activation strategies from the multiple activation strategies.

3. The method according to claim 2, wherein selecting the plurality of different activation strategies from the multiple activation strategies comprises:
determining that the device needs to be pushed with a respective activation strategy multiple times; and
selecting a different respective activation strategy each time.

4. The method according to claim 2, wherein determining multiple activation strategies to be pushed to the device comprises:

obtaining at least one activation strategy for activating the device according to a product characteristic of the device; and determining the at least one activation strategy as the multiple activation strategies to be pushed to the device.

5. The method according to claim 1, wherein activating the device according to the first activation strategy of the plurality of different activation strategies comprises:

determining the first preset activation time window for limiting a time to activate the device; and activating the device within the first preset activation time window according to the first activation strategy of the plurality of different activation strategies.

6. The method according to claim 1, wherein activating the device according to the first activation strategy of the plurality of different activation strategies comprises:

obtaining the preset number of times for supporting the activation retries; and activating the device within the preset number of times for supporting the activation retries according to the first activation strategy of the plurality of different activation strategies.

7. The method according to claim 1, wherein after the activating the device according to the first activation strategy of the plurality of different activation strategies, the method further comprises:

pushing the device information of the device and control authority of a user to control the device to the device.

8. An apparatus comprising:

one or more processors; and one or more memories storing thereon computer-readable instructions that, when executed by the one or more processors, cause the one or more processors to perform acts comprising:

decoupling a process of activating a device from a process of networking the device, the decoupling comprising removing an association relationship between the process of activating the device and the process of networking the device;

performing the process of networking the device, the process of networking the device comprising:
networking the device to a network; and
determining that the device is successfully networked; and performing the process of activating the device, the process of activating the device comprising:
receiving a plurality of different activation strategies for activating the device through an established connection; and
attempting to activate the device according to a first activation strategy of the plurality of different activation strategies within a first preset activation time window through the established connection, wherein:
the first activation strategy is obtained based at least in part on device information and functional information of the device, the device information comprising a name of the device, a model of the device, and identification information of the device, and the functional information comprising at least one of heating, dehumidification, or cooling; and
activating the device comprising performing an authorization binding between a user terminal and the device after the device is successfully networked to enable the user terminal to control the device, wherein: if the device fails to be activated according to the first activation strategy within the first preset activation time window and a number of attempting to activate the device is within a preset number of times for supporting activation retries, attempting to activate the device according to a second activation strategy having a different expiration time parameter and a different activation instruction from the first activation strategy is performed within a second preset activation time window through the established connection, the second preset activation time window being after the first preset activation time window.

9. The apparatus according to claim 8, wherein activating the device according to the first activation strategy comprises:

starting the first preset activation time window for limiting a time to activate the device according to the first activation strategy; and activating the device within the first preset activation time window.

10. The apparatus according to claim 9, wherein activating the device within the first activation time window comprises:

displaying operation prompt information for prompting to perform an activation authentication operation;

determining that operation confirmation information for performing the activation authentication operation on the device is received in the activation time window; and activating the device.

11. The apparatus according to claim 8, wherein activating the device according to the first activation strategy comprises:

obtaining the preset number of times for supporting the activation retries according to the first activation strategy;

displaying the preset number of times for supporting the activation retries; and activating the device within the preset number of times for supporting the activation retries.

12. The apparatus according to claim 8, wherein after activating the device according to the first activation strategy, the acts further comprise:

receiving the device information of the device and control authority of a user to control the device; and displaying the device information and the control authority.

13. One or more memories storing thereon computer-readable instructions that, when executed by one or more processors, cause the one or more processors to perform acts comprising:

decoupling a process of activating a device from a process of networking the device, the decoupling comprising removing an association relationship between the process of activating the device and the process of networking the device;

performing the process of networking the device, the process of networking the device comprising:
networking a device to a cloud server; and
determining that the device is successfully networked; and performing the process of activating the device, the process of activating the device comprising:

pushing a plurality of different activation strategies for activating the device to the device through an established connection after the device is successfully networked; and attempting to activate the device according to a first activation strategy of the plurality of different activation strategies within a first preset activation time window through the established connection, wherein:

the first activation strategy is obtained based at least in part on device information and functional information of the device, the device information comprising a name of the device, a model of the device, and identification information of the device, and the functional information comprising at least one of heating, dehumidification, or cooling; and activating the device comprising performing an authorization binding between a user terminal and the device after the device is successfully networked to enable the user terminal to control the device, wherein: if the device fails to be activated according to the first activation strategy within the first preset activation time window and a number of attempting to activate the device is within a preset number of times for supporting activation retries, attempting to activate the device according to a second activation strategy having a different expiration time parameter and a different activation instruction from the first activation strategy is performed within a second preset activation time window through the established connection, the second preset activation time window being after the first preset activation time window.

14. The one or more memories according to claim 13, wherein prior to pushing the plurality of different activation strategies for activating the device to the device, the acts further comprise:

determining a number of activation strategies to be pushed to the device; and selecting the plurality of different activation strategies from the number of activation strategies.

15. The one or more memories according to claim 14, wherein selecting the plurality of different activation strategies from the number of activation strategies comprises:

determining that the device needs to be pushed with a respective activation strategy multiple times; and selecting a different respective activation strategy for pushing to the device each time.

16. The one or more memories according to claim 14, wherein determining the number of activation strategies to be pushed to the device comprises:

obtaining at least one activation strategy for activating the device according to a product characteristic of the device; and determining the at least one activation strategy as the number of activation strategies to be pushed to the device.

17. The one or more memories according to claim 13, wherein activating the device according to the first activation strategy comprises:

determining the first preset activation time window for limiting a time to activate the device; and activating the device within the first preset activation time window according to the first activation strategy.

18. The one or more memories according to claim 13, wherein activating the device according to the first activation strategy comprises:

obtaining the preset number of times for supporting the activation retries; and activating the device within the preset number of times for supporting the activation retries according to the first activation strategy.

19. The one or more memories according to claim 13, wherein after the activating the device according to the first activation strategy, the acts further comprise:

pushing the device information of the device to the device.

20. The one or more memories according to claim 13, wherein after the activating the device according to the first activation strategy, the acts further comprise:

pushing control authority of a user to control the device to the device.

* * * * *